July 4, 1967    G. DE COYE DE CASTELET    3,329,078
AIR-CONDITIONING INSTALLATIONS FOR MOTOR VEHICLES
Filed Jan. 18, 1965    6 Sheets-Sheet 1

Inventor
Gaetan De Coye De Castelet
By Stevens, Davis, Miller & Mosher
Attorneys

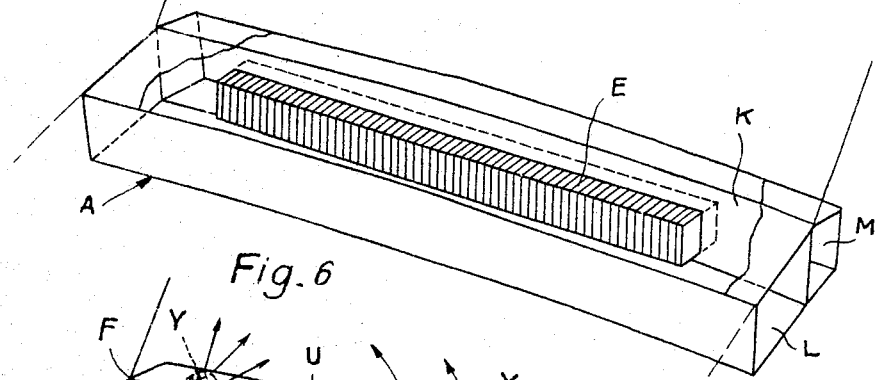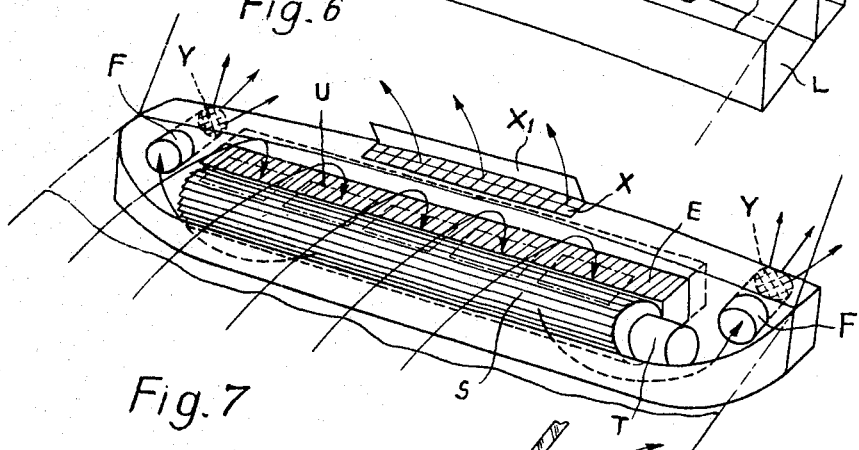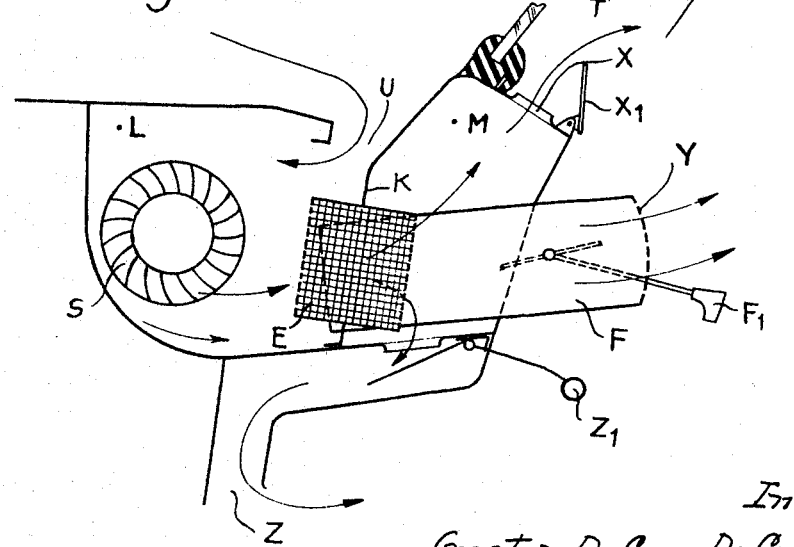

July 4, 1967    G. DE COYE DE CASTELET    3,329,078
AIR-CONDITIONING INSTALLATIONS FOR MOTOR VEHICLES
Filed Jan. 18, 1965    6 Sheets-Sheet 4

Inventor
Gaetan De Coye De Castelet
By Stevens Davis, Miller & Mosher
Attorneys

July 4, 1967 G. DE COYE DE CASTELET 3,329,078
AIR-CONDITIONING INSTALLATIONS FOR MOTOR VEHICLES
Filed Jan. 18, 1965

Inventor
Gaetan De Coye De Castelet
By Stevens Davis Miller & Mosher
Attorneys

United States Patent Office 3,329,078
Patented July 4, 1967

3,329,078
AIR-CONDITIONING INSTALLATIONS FOR MOTOR VEHICLES
Gaëtan de Coye de Castelet, Billancourt, France, assignor to Regie Nationale des Usines Renault, Billancourt, France
Filed Jan. 18, 1965, Ser. No. 426,068
Claims priority, application France, Mar. 26, 1964, 968,825, Patent 1,398,105
2 Claims. (Cl. 98—2)

Air-conditioning equipment, particularly that designed for motor vehicles, usually consists of a compact unit, thereby making it easy to remove, as well as enabling such units to be adapted to different types of vehicles and to be manufactured independently of the vehicle before being installed as a complete unit.

However, fitting such units to a vehicle requires a study to be made of the ways and means of supplying them from a source of heat such as the engine cooling water, of hooking up their incorporated fan into the electric circuit and, above all, of distributing the warm or cold air to the different parts of the passenger accommodation space. This air distribution is generally effected using ducts of relatively large cross-section for which provision must have been previously made through various parts of the bodywork.

Furthermore, such air-conditioning units are becoming larger and larger with the increasingly stringent requirements of modern comfort, so that their installation in a vehicle is often achieved at the cost of reduced spaciousness inside the vehicle.

It is the object of the present invention to overcome these drawbacks and to provide a highly efficient and inexpensive air-conditioning system which makes use for the most part of the natural supports and passages formed in the body of the vehicle for contributing to its rigidity.

The invention accordingly relates to an air-conditioning system employing a heat exchanger of large area and very great length, through which air circulation creates an air layer spread over the entire width of the sitting accommodation, thereby obviating concentrations of warm or cold air which could be unpleasant for the passengers.

This exchanger is mounted in an opening in a wall separating two long chambers transversely, one of which receives the external air and the other serving to distribute the warm or cold air through the passenger space.

These two chambers, which jointly form a box-spar, are formed by structural elements of the body and/or of the interior trim, and most notably by hollow beams of maximum length compatible with the dimensions of the vehicle.

Such beams could be cross-members with advantage, positioned in any one of the following locations:

At the base of the windscreen, beneath the scuttle,
At the base of the rear window,
At the front and/or the back of the vehicle,
In the chassis, with provision for an external air intake.

Alternatively, such beams could be the longitudinal members of a vehicle (an example being those running along the length of a motor coach beneath the windows).

An air-conditioning system according to the invention is furthermore very easy to install since the heat exchanger may be fitted, wholly or in part, in one or in several different locations.

These locations may be chosen from among those cited precedingly, or be elsewhere if desired provided that they enable the vehicle to be properly ventilated by one of the following means:

(a) by dynamic pressure and depression, the air inlets and outlets being suitably located according to the area of the body;

(b) by one or more fans for forcing the air flow through the heat exchanger, which fans may be located either upstream of the exchanger in the chamber vented to the surrounding atmosphere, downstream of the exchanger in the chamber connected to the seating space, or between these two chambers;

(c) by one or more fans creating a negative pressure in the passenger space, which draws in the outside air through the heat exchanger.

A fan utilized in this manner in the subject air-conditioning system of this invention may have its rotation axis parallel or perpendicular to the major box-spar axis, or even set obliquely thereto; it may be of the centrifugal, airscrew, or any other convenient type; it may be positioned against the heat exchanger and be long enough to cover the same, or else it may be placed at one end of the box-spar.

Preferably, the air distribution into the passenger space from the downstream box-spar chamber is effected through the natural passages formed by the various parts of the body and/or the chassis. This air is diffused by distributor devices utilizing, for instance, long flaps having a single rotation axis or any other convenient means for orientating the layer of warm or cool air at will.

The description which follows of a number of possible forms of embodiment of the invention, given with reference to the accompanying non-limitative exemplary drawing, will give a clear understanding of how the invention can be carried into practice.

In the drawing,

FIGURES 4 and 5 are schematic illustrations of a box-spar according to the invention;

FIGURES 6 and 7 are respectively a perspective view and a vertical sectional view through the centerline of the vehicle, showing a first form of embodiment of an air-conditioning system according to the invention;

Figure 1:
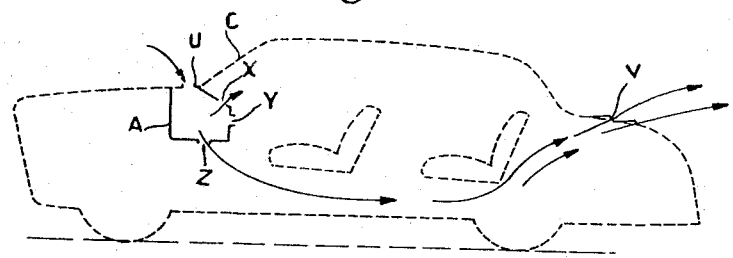
FIGURES 1, 2 and 3 are three possible schematic illustrations of an installation according to the invention on a motor vehicle.

FIGURE 1 shows in dash lines the contour of a motor vehicle air-conditioned in accordance with the present invention. In this figure, A is a box-spar containing, according to the invention, the main air-conditioning elements and, in the specific form illustrated, consists of a hollow transverse structural beam located at the base of the windscreen C. The outside air is drawn in through openings U, passes through the box-spar where it is treated as required, emerges into the passenger space through the openings X, Y, Z, and then exhaust from the passenger space through V.

This air circulation may operate solely by the dynamic effect produced by the motion of the vehicle, or else by forced ventilation using apparatus comprising at least one fan.

Figure 2:
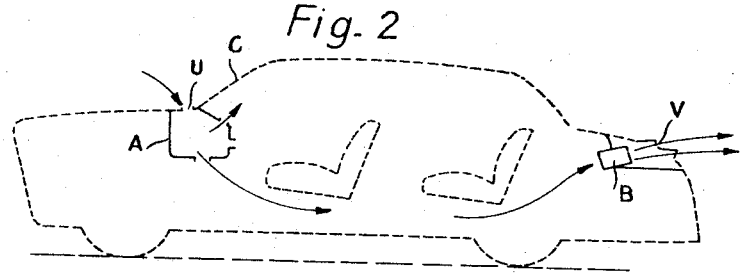

Such ventilation apparatus may be included within the box-spar A; alternatively, as shown in FIGURE 2, it may consist of one or more fans B rotating in the air exhausting sense, thereby creating a negative pressure in the passenger space that causes fresh air to be drawn in through U.

Figure 3:
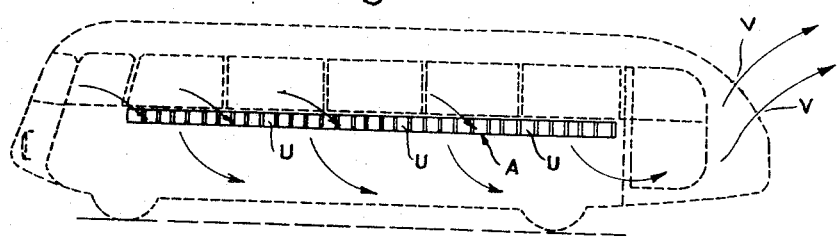

In an alternative constructional form shown in FIGURE 3, the box-spar A is formed in two longitudinal structural members running beneath the windows of a motor coach.

Figure 4:
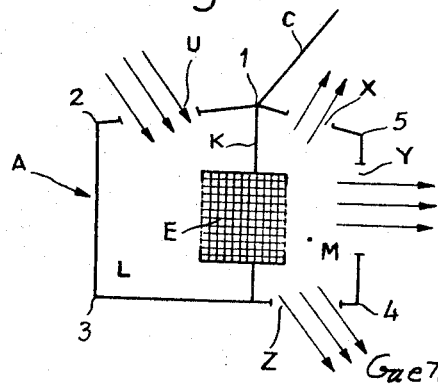

In its most general form (see FIGURES 4 and 5), a box-spar according to the invention is provided, within a prismatic surface of cross-section 1, 2, 3, 4, 5 (see FIG. 4), with a partition K having an opening therein into which is fitted a large-capacity heat exchanger E having the maximum length compatible with the dimension of box-spar A and the layout of the equipment mounted in the box-spar.

This box-spar is thus divided by partition K into two chambers L and M, of which the former is vented and receives the outside air through the openings U which it delivers, wholly or partly, into the exchanger E, and of which the latter receives this air from the exchanger and distributes it into the passenger space through orifices such as X, Y, Z.

When the box-spar is formed in a hollow cross-member located at the bottom of the windscreen, in accordance with a preferred embodiment of this invention, the windscreen may be positioned as at C.

The specific constructional forms which will be described hereinbelow all conform to this preferred embodiment.

The constructional form shown in FIGURES 6 and 7 utilizes a horizontal-axis centrifugal blower S driven by an electric motor T.

This blower is unusually long in order to cover the entire length of the heat exchanger E against which it is mounted.

Air from the chamber L can be caused to bypass the heat exchanger E and to be delivered directly into the passenger space by means of duct segments F whose apertures are controlled by valves regulated from the interior passenger space by means, say, of levers $F_1$.

A flap $X_1$ and a lever $Z_1$ similarly control the heated air flows issuing from the chamber M through openings X and Z respectively.

Figure 8:
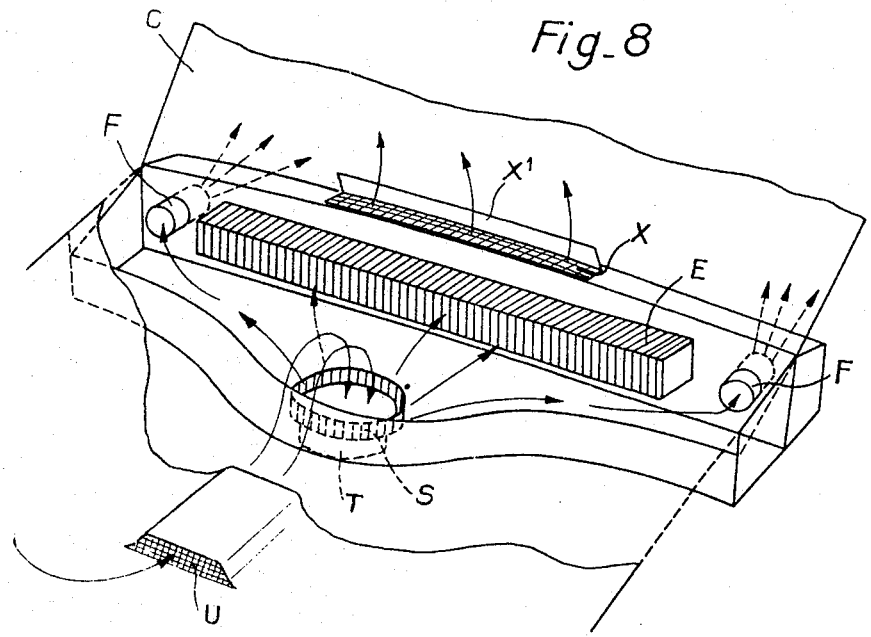
FIGURES 8 and 9 show an alternative form of embodiment.
Figure 9:
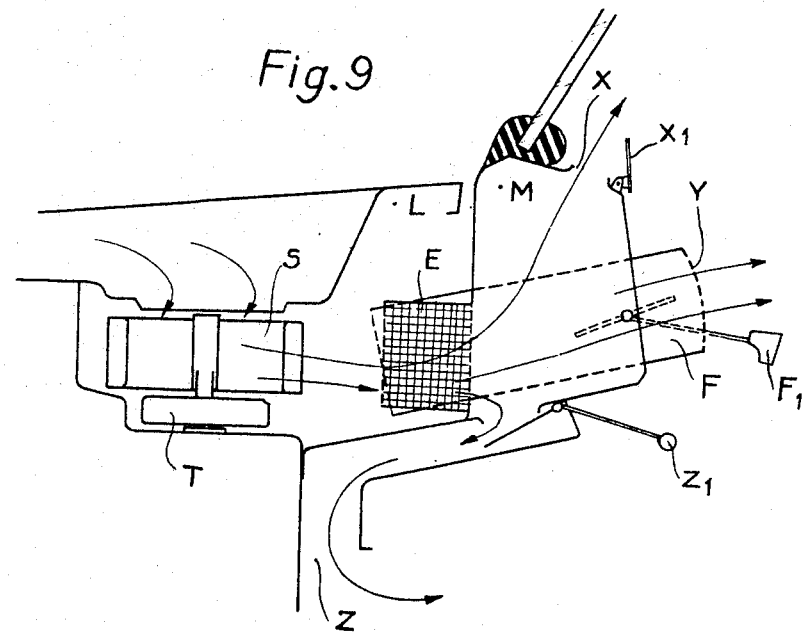

In the form of embodiment shown in FIGURES 8 and 9, the blower S is likewise of the centrifugal type but has a vertical axis. In this case the electric motor T is located beneath the blower, while the air inlet duct is located beneath the bonnet and is connected to a mesh-protected intake U.

In this case also the air blown by the blower flows in part through the exchanger E, spreading subesquently through the passenger space from openings X and Z, and in part through the pipes F directly into the passenger space.

Figure 10:
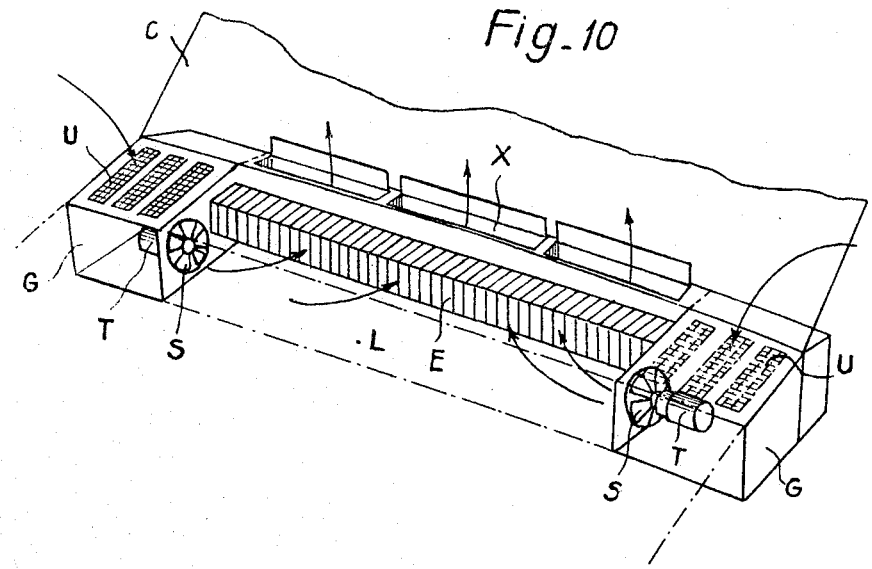
FIGURES 10 and 11 illustrate yet another alternative embodiment.
Figure 11:
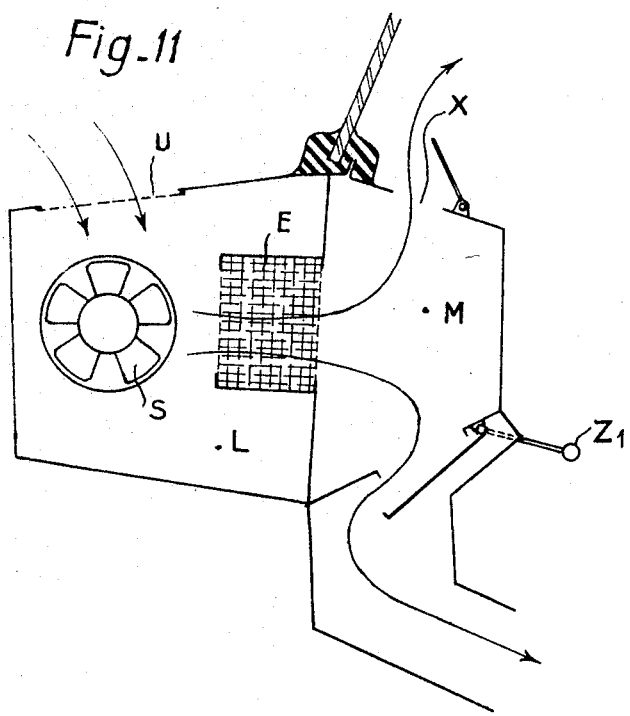

In the embodiment illustrated in FIGURES 10 and 11, a terminal chamber G is provided at each end of the box-spar. Two airscrew fans S and their motors T are mounted into the walls separating these chambers G from the chamber L. The air intakes U are located at the top of the chambers G. The outside air drawn into these chambers G through the intakes U passes into L, then into M via the heat exchanger E, and thence into the passenger space through the outlets X and Z.

Figure 12:
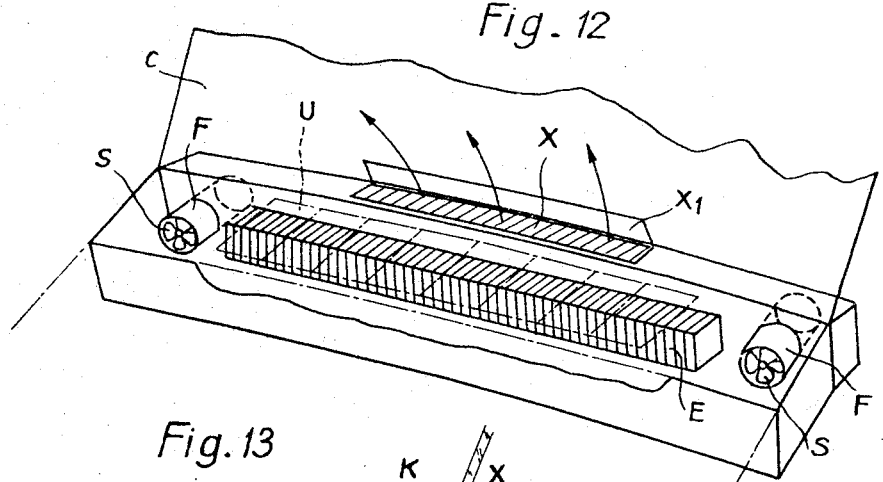
FIGURE 12 is a perspective view of a fourth possible constructional form.
Figure 13:
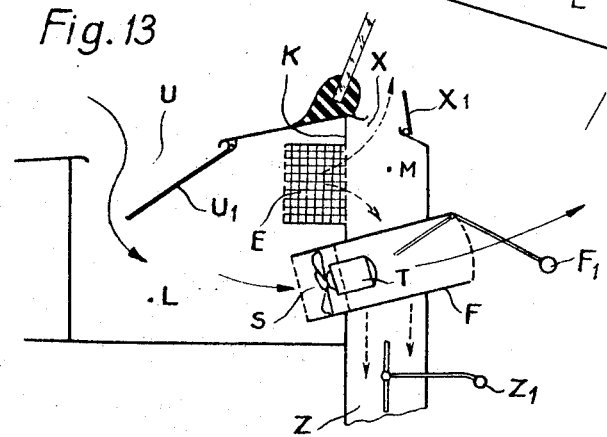
FIGURES 13 and 14 are vertical sectional views through the centerline of the vehicle, showing two different states of operation.
Figure 14:
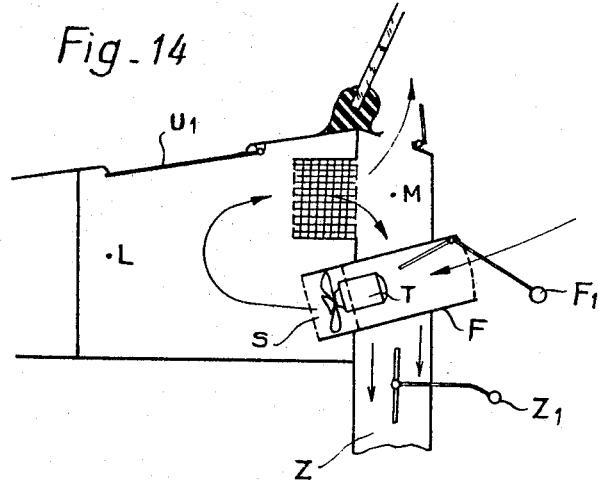

Reference is next had to FIGURES 12, 13 and 14 for an alternative form of embodiment utilizing two horizontal-axis airscrew fans housed in the pipes F. The air intakes U are controlled by flaps $U_1$.

The air-conditioning is effected to two stages. In the first stage (see FIGURE 13), the flaps $U_1$ are open and the fans S blow fresh air directly from chamber L into the passenger space. In the second stage (see FIGURE 14), the flaps $U_1$ are closed and the fans S are driven in the opposite direction and suck the air in the passenger space through the pipes F; the air which is thus caused to pass into the chamber L then passes through the heat exchanger E, then into the chamber M and then back again into the passenger space, the air of which is thus recycled.

In the constructional form shown in FIGURES 15 through 19, the fan S, which is driven by a motor T (see FIGURE 19), is mounted in the passenger space and blows the air therein out to the exterior, in the manner shown schematically in FIGURE 2.

The cylindrical heat exchanger E mounted in the box-spar occupies the entire length thereof.

As in the preceding examples, the chamber L is formed in a single block and receives the outside air through intakes U.

The rearward chamber M is divided into a central portion $M_1$ and two terminal portions $M_2$ by means of two partitions $J_1$ and $J_2$. The central portion $M_1$ communicates with the top of the passenger space via a flap $X_1$.

Figure 15:
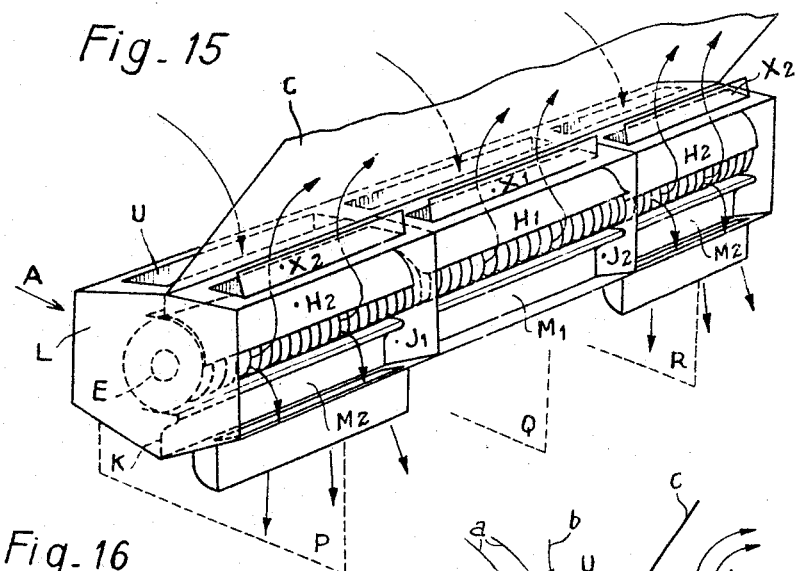
FIGURE 15 is a perspective view of a fifth form of embodiment of the invention.
Figure 16:
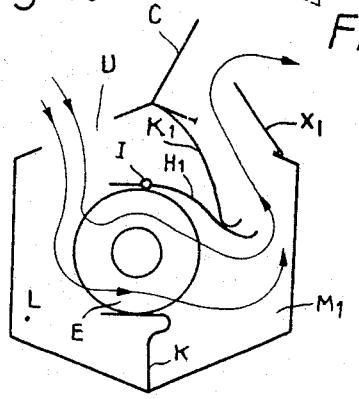
FIGURES 16 and 17 are vertical sectional views through the same centerplane Q of FIGURE 15, showing two different states of operation.
Figure 17:
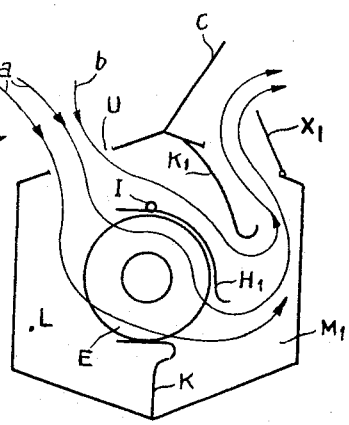
Figure 19:
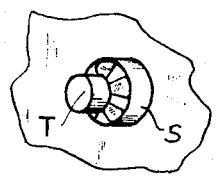
FIGURE 19, taken in conjunction with FIGURE 15, shows an electric fan for blowing the air in the passenger space out into the surrounding atmosphere.

FIGURE 16 is a vertical sectional view taken through a vertical plane Q in FIGURE 15, and clearly shows that the top $K_1$ of partitions K separating chambers L and M is curved, and that a flap $H_1$ pivotally mounted about a shaft I parallel to the axis of heat exchanger E is adapted either to contact the wall $K_1$ (see FIGURE 16) or to hug the contour of the heat exchanger (see FIGURE 17), rotation of this flap being controlled by any convenient means (not shown).

Figure 18:
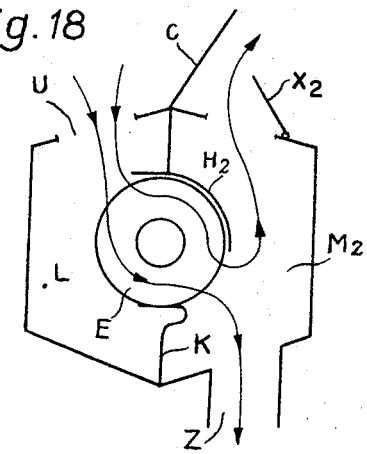
FIGURE 18 is a vertical section through the plane P or the plane R of FIGURE 15.

In each of the terminal chambers $M_2$, the top of the partition K is connected to a fixed partition $H_2$ which covers the exchanger in the manner shown in FIGURE 18. In addition to the upper flaps $X_2$, these terminal chambers are provided at their bottoms with discharge nozzles Z.

The system hereinbefore described operates in the following manner.

Fresh air penetrating into chamber L is drawn into the three rearward chambers. In the central chamber $M_1$, when the flap $H_1$ is raised (FIGURE 16), all the air flowing from L into $M_1$ passes through the heat exchanger. When the flap $H_1$ is lowered (FIGURE 17), a portion of the air flow passes through the heat exchanger along a path noted by arrows $a$ and another portion of this flow by-passes E and follows paths as denoted by arrows $b$. It will, of course, readily be understood that the position of flap $H_1$ can be adjusted to obtain any intermediate mixture of warm air and cool air.

Air into each of the terminal chambers $M_2$ must compulsorily pass through the heat exchanger, so that the upper and lower orifices X and Z for discharging air into the passenger space can deliver only warm air thereinto.

It is to be understood that the present invention likewise includes in its scope combinations of the warm and cool air regulating means other than those disclosed hereinabove as being provided in the central chamber $M_1$ and in the two terminal chambers $M_2$.

What is claimed is:
1. An air-conditioning system for motor vehicles having a hollow transverse girder extending across the vehicle immediately beneath a windscreen comprising a longitudinal center partition in said transverse girder forming a forward air receiving chamber and a rearward air-conditioned chamber, an opening in said partition, a heat exchanger having a length substantially equal to said girder and being mounted in said opening, orifice means in said forward chamber for receiving the ambient air therein, fan means in said forward chamber for drawing in ambient air and passing said air through said heat exchanger means in said rearward chamber for distributing air to the passenger space, said means comprising at least one orifice disposed toward said windscreen, and at least one second orifice downwardly directed towards the floor of said vehicle, said second orifice being parallel to and extending substantially the entire length of said heat exchanger, and valve means for selectively opening and closing said second orifice means.

2. An air-conditioning system for a motor vehicle having a hollow transverse girder positioned beneath the windscreen comprising partition means within said transverse girder dividing the space therein into a forward air receiving compartment and a rearward air-conditioning compartment, an orifice in said partition, heat exchange means of great length disposed within said orifice, orifice means connecting said forward compartment with ambient air, horizontal axis centrifugal blower positioned parallel to and in front of said heat exchanger, duct means at each end of said transverse girder connecting said forward air space directly to a passenger compartment, orifice means in said rear compartment directed toward said windscreen, second orifice means in said rear compartment directed towards the vehicle floor, valve means disposed in each of said orifice means and each said duct means, means for selectively actuating said valve means.

References Cited
UNITED STATES PATENTS

| | | | |
|---|---|---|---|
| 2,304,642 | 12/1942 | Hans | 98—2.4 |
| 2,510,790 | 6/1950 | Arnold | 98—2.4 |
| 2,796,820 | 6/1957 | Moore | 98—2.4 |
| 2,837,018 | 6/1958 | Haltenberger | 98—2.6 |
| 3,078,779 | 2/1963 | Wilfert | 98—2.4 |
| 3,105,431 | 10/1963 | Stratton | 98—2.4 |

FOREIGN PATENTS

| | | |
|---|---|---|
| 1,339,569 | 9/1963 | France. |

MEYER PERLIN, *Primary Examiner.*